UNITED STATES PATENT OFFICE.

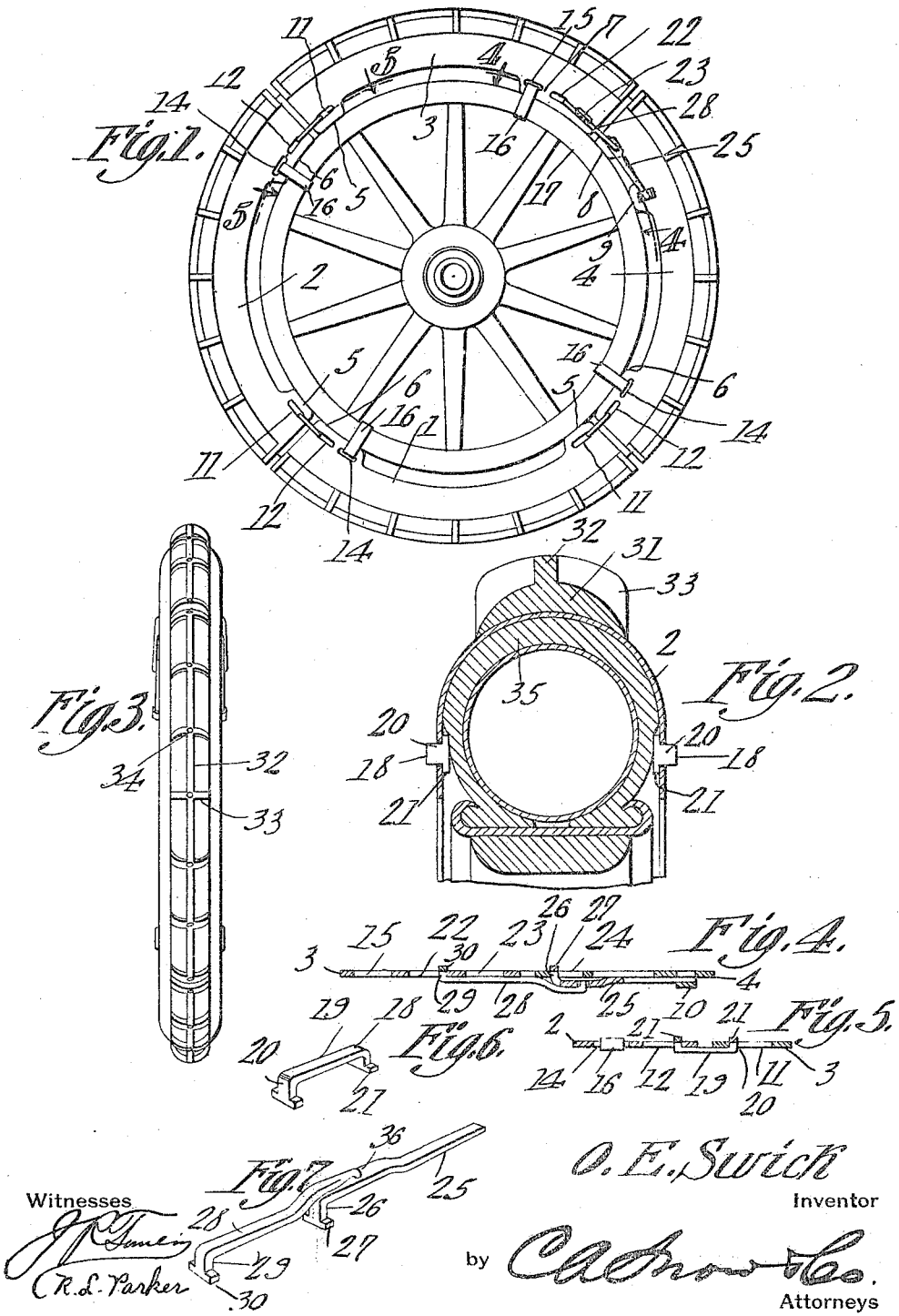

ORVILLE E. SWICK, OF WESTON, WEST VIRGINIA.

NON-SKID AUTOMOBILE-CHAIN.

1,180,205.

Specification of Letters Patent.

Patented Apr. 18, 1916.

Application filed February 19, 1915. Serial No. 9,304.

*To all whom it may concern:*

Be it known that I, ORVILLE E. SWICK, a citizen of the United States, residing at Weston, in the county of Lewis and State of West Virginia, have invented a new and useful Non-Skid Automobile-Chain, of which the following is a specification.

The device forming the subject matter of this application is a protector or guard adapted to be applied to a pneumatic tire for the double purpose of preventing wear on the tire and preventing skidding.

The invention aims, primarily, to provide novel means for operatively assembling the constituent sections of the protector or guard.

It is within the scope of the invention to improve the general construction of the sections which make up the guard.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in side elevation, a wheel the tire of which is equipped with the protector or guard forming the subject matter of this application; Fig. 2 is a cross section; Fig. 3 shows the wheel of Fig. 1 viewed edgewise and in elevation; Fig. 4 is a section on the line 4—4 of Fig. 1; Fig. 5 is a section on the line 5—5 of Fig. 1; Fig. 6 is a perspective of one of the links; Fig. 7 is a perspective showing the connecting levers and the link which is assembled therewith.

The tire protector constituting the subject matter of this application comprises any desired number of trough-shaped sections which preferably are fashioned from steel and if desired from resilient steel. In the present instance the protector is shown as comprising four sections numbered respectively 1, 2, 3 and 4 on the drawings.

The sections 1 and 2 are alike, each of the sections 1 and 2 being provided at one end with relatively small wings 5, and being provided at its other end with larger wings 6. The wings 5 and 6 of the respective sections are disposed adjacent each other. One end of the section 3 is provided with small wings 5 and one end of the section 4 is provided with the larger wings 6 above alluded to. The section 3 at one end is provided with a pair of relatively large wings 7 disposed adjacent wings 8 on the section 4, the section 4 having wings 9 which are spaced from the wings 8. From the wings 9, outstanding, hook-shaped lips or lever stops 10 are struck.

Each of the wings 5 is provided with an opening 11 and in the adjacent end of the wing 6 there is formed an opening 12. The wings 6 in addition to the openings 12 are provided with openings 14 and in each of the wings 7 on the section 3, openings 15 are formed. Assembled with the openings 14 and 15 are straps 16 or like detachable securing means which, passing transversely of the wheel rim 7 serve to hold the protector forming the subject matter of this application upon the tire 35.

The openings 11 and 12 constitute a part of the means whereby the adjacent ends of certain of the sections of the protector are connected. The connecting means under consideration further includes a plurality of links 18, one of which is shown in Fig. 6, each link 18 comprising a body 19 provided with rectangular extensions 20 at its ends, the extensions 20 terminating in heads 21 which lie transversely of the body 19 of the link. The extensions 20 of the link 18 lie in the openings 11 and 12, and the heads 21 extend transversely of the openings and engage the inner sides of the constituent sections of the protector. The construction is such that any link may be removed readily when the same is turned so that it stands radially of the wheel, under which circumstances, the head 21 may be withdrawn through the opening 11 or the opening 14. When, however, the body portions 19 of the links extend circumferentially of the wheel, the links cannot be detached from the sections, because the heads 21 of the links extend transversely of the openings 11 and 12 and engage the inner face of the sections. It will therefore be seen that although the protector by means of the links 18 is held in operation securely upon the wheel, the constituent sections of the protector, nevertheless, may be detached readily from each other when a mechanism to be described hereinafter is loosened, thereby permitting a slacking away of the protector.

In the wings 7 of the section 3 are formed openings 22 and 23 one of which is for the purposes of adjustment. In the wings 8 of the section 4, openings 24 are formed.

The invention comprises a pair of levers 25, one of which is shown in Fig. 7 in detail, each lever 25 terminating at its inner end in a rectangularly disposed extension 26 having a transverse head 27. Assembled with each lever 25 is a link 28 having a rectangularly disposed extension 29 terminating in a transverse head 30. The links 28 are pivotally assembled with the levers 25 intermediate the ends of the levers as shown at 36.

In practical operation, the links 8 are so disposed that they stand radially of the tire and extend outwardly. The heads 30 are then passed through the openings 22 and the heads 27 of the levers 25 are passed through openings 24. Then, the free ends of the levers are swung inwardly toward the hub of the wheel, the free ends of the levers being engaged behind hook-shaped lips or stops 10 as will be understood clearly from Fig. 4. Under the circumstances above pointed out, the heads 30 extend transversely of the openings 22 and the heads 27 extend transversely of the openings 24, an accidental detachment of the parts being practically impossible after the links and the levers have been disposed in their locked positions.

Applied to each of the sections 1, 2, 3 and 4 is a circumferential tread strip 31, preferably fashioned from steel, the strip 31 comprising a longitudinal rib 32 intersected at intervals by transverse ribs 33. At the point of intersection between the ribs 32 and 33, the strip 31 is assembled with the section by means of rivets 34 or other securing means adapted to a like end.

Having thus described the invention, what is claimed is:—

A tire protector comprising sections, one of which is provided with a stop, both of the sections being equipped with slots near their meeting ends; a lever extended circumferentially of the protector and engaged by the stop, and a link extended circumferentially of the protector, the link being pivotally assembled with the lever, the link and the lever being provided with angular extensions lying in the slots of the respective sections, and the extensions being provided with transverse heads engaging the respective sections, the heads being removable through the slots when the link and the lever lie in an approximately radial direction with respect to the protector.

In testimony that I claim the foregoing as my own, I have hereto affixed my signature in the presence of two witnesses.

ORVILLE E. SWICK.

Witnesses:
J. CLINE HOOD,
JOHN H. CONRAD.